Figure 1:
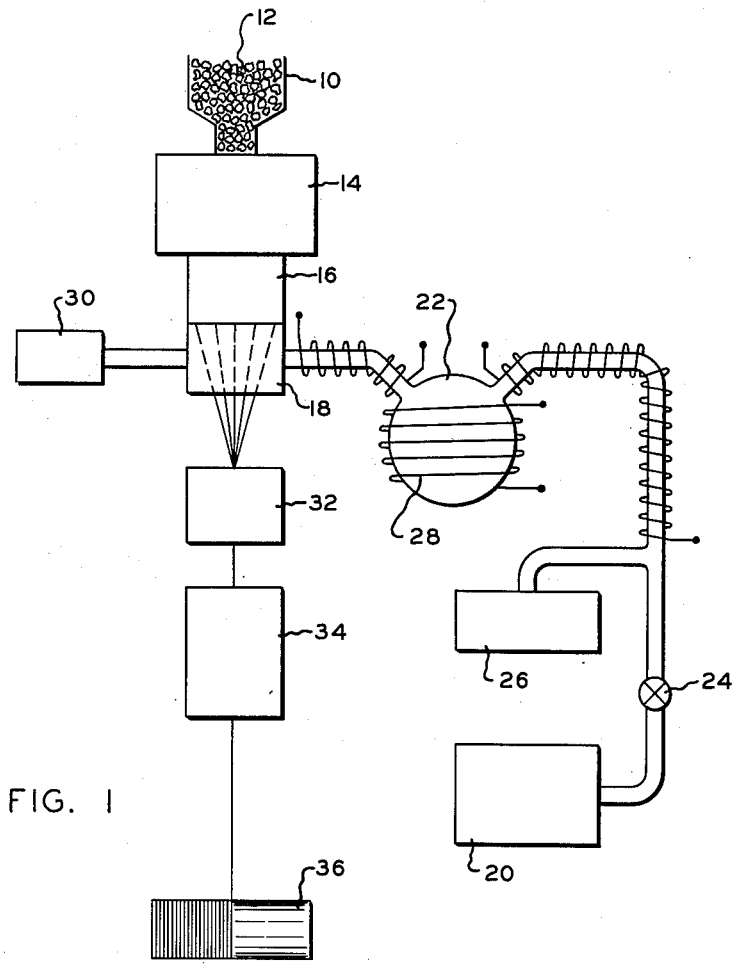

April 23, 1963          L. MAGER          3,086,902
METHOD OF MAKING A PRESSURE VESSEL BY WINDING
METALLIC-COATED GLASS FILAMENTS
Filed April 6, 1960

INVENTOR
*Louis Mager*
BY *Morse + Altman*
ATTORNEYS

United States Patent Office 3,086,902
Patented Apr. 23, 1963

3,086,902
METHOD OF MAKING A PRESSURE VESSEL BY WINDING METALLIC-COATED GLASS FILAMENTS
Louis Mager, Framingham, Mass., assignor to The Alloyd Corporation, Watertown, Mass., a corporation of Massachusetts
Filed Apr. 6, 1960, Ser. No. 20,414
4 Claims. (Cl. 156—167)

The present invention relates to the manufacture of glass fiber products and, more particularly, to processes and products involving glass fiber materials of unusual strength.

The tensile strength of glass fiber may be utilized in a variety of ways. For example, the winding of glass fiber yarn about the circumference of rocket motors or other pressure vessels make substantial weight reduction possible. The occurrence of flaws following the drawing of glass fiber from the glass melt tends to weaken the glass fiber considerably below its theoretical fracture strength of millions of pounds per square inch. It is well known that glass and other vitreous materials have high compression but low tensile strength. Flaws in fiber of such materials result from the mechanical action of bending stresses and strains and the chemical action of air and moisture. Both this mechanical and chemical action tend to concentrate at the surface of the glass fiber. The present invention contemplates cladding vitreous fibers in such a way as to reduce the occurrence of such flaws. The cladding material operates mechanically to prevent fracture by applying a compressive load, which during bending of the fiber, adds to the residual compressive stress on the concave surface in a manner easily tolerated by the fiber and counteracts the tensile stress on the convex surface in a manner that protects the fiber from fracture. The cladding material operates chemically to seal the surface of the fiber from air and moisture.

Primary objects of the present invention are: to prevent the weakening of vitreous fiber by depositing thereon, immediately upon its formation and before its subjection to mechanical and chemical action, an extremely thin metallic coat from a metal bearing vapor; to diffusion bond a plurality of such coated vitreous fibers into a yarn; and to provide pressure vessels and the like about which such a yarn is wound.

Other objects of the present invention will in part be obvious and will in part appear hereinafter.

The invention accordingly comprises the process involving the several steps and the relation and order of one or more of such steps with respect to each of the others, and the apparatus possessing the construction, combination of elements and arrangement of parts, which are exemplified in the following detailed disclosure, and the scope of which will be indicated in the appended claims.

Figure 2:
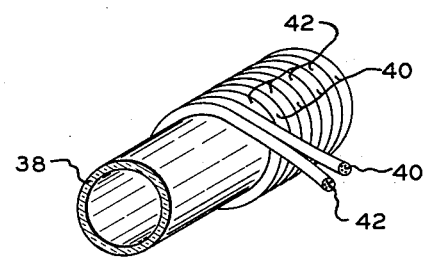

For a fuller understanding of the nature and objects of the present invention, reference should be had to the following detailed description, taken in connection with the accompanying drawing, wherein:

FIG. 1 is a diagrammatic view of an apparatus for performing a process of the present invention; and FIG. 2 is an exaggerated, fragmentary view of a product of the present invention.

Generally, the process illustrated herein involves drawing filaments from a molten mass of glass directly into an atmosphere of a metal bearing compound, collecting filaments so formed or fragments thereof into a strand, diffusion bonding the components of the strand together, and winding the strand about a pressure vessel that is intended to withstand high pressures. In conventional fashion, the glass contains silicon dioxide fused with such materials as alkali oxides and alkaline earth oxides. The metal coat, which is provided by reduction from or decomposition of a vapor containing a compound of the metal, ranges from .0001 to .001 inch in thickness. The filaments or fragments so coated may be diffusion bonded together in any suitable way such as by braising. In order to secure a satisfactory bond between the metal coat and the surface to which it is applied, it is desirable that the coat be composed of a substantially pure metal, either elemental or alloyed, it being particularly important that the metal be substantially oxygen free. Preferably the metal bearing gas is mixed with an auxiliary reducing gas such as hydrogen or an inert gas such as argon, the mixture ranging in temperature from 200 to 1000° C. and ranging in proportion from 1 to 30% by total weight of the metal bearing gas.

The gaseous metal bearing compounds preferably are selected from: carbonyls such as ferric carbonyl, molybdenum carbonyl, nickel carbonyl, chromium carbonyl, tungsten carbonyl and cobalt carbonyl; halides such as chromium chloride, tungsten chloride, molybdenum chloride, aluminum chloride, aluminum bromide, aluminum iodide, cobalt bromide, cobalt chloride, ferric chloride, germanium bromide, germanium chloride, manganese fluoride, molybdenum fluoride, tungsten fluoride, chromium fluoride, nickel bromide, nickel chloride, tin bromide, tin chloride, tin fluoride and titanium chloride; alkyls such as aluminum triisobutyl and aluminum triethyl; aryls such as chromium dibenzene, molybdenum dibenzene, vanadium dibenzene and vanadium di-mesitylene di-iodide; olefins such as bis-cyclopentadienyls of iron, manganese, cobalt, nickel, rhodium and vanadium; esters such as cupric acetylacetonate, manganic acetylacetonate, titanyl acetylacetonate, platinum acetylacetonate, copper formate and copper acetate; nitro compounds such as copper nitroxyl and cobalt nitrosyl carbonyl; hydrides such as antimony hydride and tin hydride; and combinations thereof such as, bis-cyclopentadienyl chlorides, bromides and iodides of titanium zirconium hafnium vanadium molybdenum, tungsten and tantalum cyclopentadienyl carbonyls such as cyclopentadienyl manganese tricarbonyl, bis-cyclopentadienyl carbonyls of molybdenum, tungsten or iron, carbonyl halogens such as sodium carbonyl bromide, ruthenium carbonyl chloride, and organo hydride compounds such as aluminum diethyl hydride and aluminum dimethyl hydride.

FIG. 1 illustrates diagrammatically apparatus for forming fiberglass yarn in accordance with the present invention. This apparatus comprises a funnel 10 containing a plurality of glass marbles 12. From funnel 10, marbles 12 are directed into an electric furnace 14 where they are heated to form a molten liquid that flows through orifices (not shown) at the lower face of a bushing 16 to produce filaments. The diameter of the filaments is accurately determined by regulating the viscosity and temperature of the molten mass, the size of the orifices at the lower face of bushing 16 and the rate of speed at which the filaments are drawn from the bushing. From bushing 16, the fibers are advanced through a coating chamber 18 in which mixture of a metal bearing vapor and an auxiliary gas in accordance with the present invention are passed. The mixture is supplied by passing the auxiliary gas from a supply 20 over the solid metal-bearing compound in chamber 22. Suitable valves 24, manometers 26, heating coils 28 and pumps 30 are provided to maintain the mixture at desired temperature and pressure. Gathering the fibers is effected by advancing the fibers within station 32 in contact with a pad (not shown), to which the fibers converge. Finally the yarn is wound tightly as a helix about a pressure vessel 36. The fibers are bonded either in a heating chamber 34 by sintering or after they have been wound as a yarn about pressure vessel 36.

*Example I*

In one specific example of the foregoing process effected by the above described apparatus, glass fibers are drawn from the melt at a temperature of approximately 350° C. The vapor of molybdenum carbonyl, heated to approximately 90° C., and hydrogen, at approximately 5 times the pressure of the molybdenum carbonyl is introduced. The vapor deposition chamber is heated to a temperature of 450° C. The flow rate through the vapor deposition chamber is 20 mols per hour. Each increment of glass fiber is coated with a molybdenum coat of approximately .001 inch in a period of one half hour. Thereafter, approximately 50 of such fibers are collected into a yarn. Finally, the yarn is wound around a pressure vessel and the entire product is sintered for a period of one half hour at a temperature of 1000° C. to produce a product of extremely high pressure resistance.

*Example II*

In another specific example of the foregoing process effected by the above described apparatus, glass fibers are drawn from the melt at a temperature of approximately 350° C. The vapor of chromium dicumene at a temperature of 100° C., and a pressure of 30 mm. Hg is passed in contact with the glass fibers for a period of 30 minutes. The vapor deposition chamber is heated to a temperature of 450° C. The flow rate through the vapor deposition chamber is maintained at a rate sufficient to deposit a coat of approximately .001 inch of chromium in a period of one half hour. Thereafter approximately 50 of such fibers are collected into a yarn. The yarn is wound around a pressure vessel and sintered for a period of one half hour at a temperature of 1000° C. to produce a product of extremely high pressure resistance.

*Example III*

In a more complex approach to the technique of making fiberglass bonded structures, two different glass coatings are used. Preferably the two metals of these coatings exhibit a mutual eutectic or depressed solidus, in consequence of which the fibers can be joined advantageously by simple diffusion bonding, i.e. sintering or the like by which contiguous surfaces become interdiffused, when wound adjacently to each other. Two such strands of short glass fibers coated respectively with two such metals are shown in FIG. 2 at 40 and 42 wound about a tubular pressure vessel 38. Strands 40 and 42, because of their differing metallic coatings, after being wound about tubular pressure vessel 38, may be bonded into an integral structure by simple diffusion bonding. For example, with copper and lanthanum, a eutectic melting temperature is reached at 460° C. This is a reasonably low bonding temperature which has little adverse effect on glass fibers.

Since certain changes may be made in the above disclosure without departing from the scope of the invention herein involved, it is intended that all matter contained in the above description or shown in the accompanying drawing shall be interpreted in an illustrative and not in a limiting sense.

What is claimed is:

1. The process of fabricating a pressure vessel capable of withstanding high internal pressure, said process comprising the steps of drawing filaments from a molten mass of glass directly into an atmosphere of a heat decomposable metal bearing compound, heating said atmosphere at said filaments to the decomposition point of said compound in order to deposit metal from said compound on said filaments in the range of from .0001 to .001 inch thick, winding said filaments about said pressure vessel so that increments of said coating on said filaments are contiguous, and diffusion bonding said contiguous increments together by heating said pressure vessel and said filaments.

2. A process comprising the steps of drawing glass fibers from a melt at a temperature of approximately 350° C. into a vapor deposition chamber, introducing molybdenum carbonyl and hydrogen at a temperature of approximately 90° C., said hydrogen being at approximately five times the pressure of said molybdenum carbonyl vapor, heating said vapor deposition chamber to approximately 450° C., the flow rate of said mixture through said vapor deposition chamber being approximately 20 mols per hour, advancing said filaments through said vapor deposition chamber in a period of approximately one-half hour to produce a coat on said filaments ranging in thickness from .0001 to .001 inch, winding said filaments about a pressure vessel in order to cause portions of the coat on said filaments to be contiguous, and sintering the product including said pressure vessel and said filaments together for a period of approximately one-half hour at a temperature of approximately 1,000° C. in order to diffusion bond said portions of said coat together.

3. The process of drawing glass fibers from a melt at a temperature of approximately 350° C. into a vapor deposition chamber at a temperature of 100° C., subjecting said fibers to the vapor of chromium dicumene at a temperature of approximately 450° C. and a pressure of approximately 30 mm. Hg, the flow rate of said chromium dicumene through said vapor deposition chamber being maintained at a rate sufficient to deposit a coat of approximately .001 inch of chromium in a period of one-half hour, collecting approximately fifty of said fibers into a yarn, winding said yarn about a pressure vessel in order to cause portions of said coat to be contiguous, and sintering the product including said pressure vessel and said yarn for a period of approximately one-half hour at a temperature of approximately 1000° C. in order to diffusion bond said portions of said coat together.

4. The process comprising the steps of drawing first filaments from a molten mass of glass directly into an atmosphere of a heat decomposable metal compound, depositing metal from said compound under heat to form a coating on said first filaments, drawing second filaments from a molten mass of glass directly into an atmosphere of a second heat decomposable metal compound, depositing metal from said second compound on said second filaments to form a coating, winding said first filaments and said second filaments about a pressure vessel in order to cause portions of said coating of said first filaments and portions of said coating of said second filaments to be contiguous, and diffusion bonding said contiguous portions of said coating of said first filaments and said coating of said second filaments together at elevated temperature.

References Cited in the file of this patent

UNITED STATES PATENTS

| | | |
|---|---|---|
| 2,616,165 | Brennan | Nov. 4, 1952 |
| 2,699,415 | Nachtman | Jan. 11, 1955 |
| 2,785,651 | Pawlyk | Mar. 19, 1957 |
| 2,812,272 | Nack et al. | Nov. 5, 1957 |
| 2,818,351 | Nack et al. | Dec. 31, 1957 |
| 2,860,450 | Case | Nov. 18, 1958 |
| 2,915,806 | Grant | Dec. 8, 1959 |
| 2,938,821 | Nack | May 31, 1960 |